United States Patent [19]
Seike et al.

[11] Patent Number: 5,584,895
[45] Date of Patent: Dec. 17, 1996

[54] PROCESS FOR PREPARING SOLIDIFIED MATERIAL CONTAINING COAL ASH

[75] Inventors: Shoji Seike, Nagoya; Osamu Imai, Kasugai; Junko Yoshizawa, Nagoya, all of Japan

[73] Assignee: NGK Insulators, Ltd., Nagoya, Japan

[21] Appl. No.: 400,972

[22] Filed: Mar. 8, 1995

[30] Foreign Application Priority Data

| | | | |
|---|---|---|---|
| Apr. 18, 1994 | [JP] | Japan | 6-078466 |
| Apr. 21, 1994 | [JP] | Japan | 6-083274 |
| Jun. 17, 1994 | [JP] | Japan | 6-136065 |
| Jan. 19, 1995 | [JP] | Japan | 7-006317 |
| Jan. 19, 1995 | [JP] | Japan | 7-006322 |
| Jan. 19, 1995 | [JP] | Japan | 7-006324 |

[51] Int. Cl.$^6$ .................. C10L 5/28; C04B 14/00
[52] U.S. Cl. ............... 44/598; 44/580; 106/705; 106/DIG. 1; 264/DIG. 49
[58] Field of Search .................. 44/559, 580, 598, 44/405; 106/DIG. 1, 705, 50, 545; 264/DIG. 49

[56] References Cited

U.S. PATENT DOCUMENTS

| | | | |
|---|---|---|---|
| 2,691,598 | 10/1954 | Meurice et al. | 264/DIG. 49 |
| 2,724,656 | 11/1955 | Gunzelmann et al. | 264/DIG. 49 |
| 2,946,112 | 7/1960 | Tucker, Jr. et al. | 264/DIG. 49 |
| 3,192,060 | 6/1965 | Tilsen | 264/DIG. 49 |
| 3,573,940 | 4/1971 | Cockrell et al. | 106/84 |
| 4,057,398 | 11/1977 | Bennett et al. | 44/574 |
| 4,659,385 | 4/1987 | Gostopoulos et al. | 106/DIG. 1 |
| 4,770,831 | 9/1988 | Walker | 264/DIG. 49 |
| 4,880,582 | 11/1989 | Spanjer et al. | 264/DIG. 49 |
| 5,137,753 | 8/1992 | Bland et al. | 264/DIG. 49 |
| 5,350,549 | 9/1994 | Boyle | 264/DIG. 49 |
| 5,366,548 | 11/1994 | Riddle | 264/DIG. 49 |
| 5,374,307 | 12/1994 | Riddle | 264/DIG. 49 |
| 5,405,441 | 4/1995 | Riddle | 264/DIG. 49 |

FOREIGN PATENT DOCUMENTS

| | | | |
|---|---|---|---|
| 0972851 | 11/1960 | United Kingdom | 264/DIG. 49 |
| 2016241 | 5/1981 | United Kingdom | |

OTHER PUBLICATIONS

*Trace Elements In Coal*, vol. II, Valković, FLA. 1983, pp. 14,15 and 25–34.

Primary Examiner—Margaret Medley
Attorney, Agent, or Firm—Ronald J. Kubovcik

[57] ABSTRACT

A process for preparing a solid material containing coal ash includes a first step of mixing coal ash with a calcium compound to obtain a mixture, a second step of molding the mixture to obtain a molded article, and a third step of subjecting the molded article obtained in the second step to a hydrothermal treatment at a temperature of at least 120° C. under high pressure. In the first step, 40 to 95 parts by weight of the coal ash is mixed with 60 to 5 parts by weight of the calcium compound, and the coal ash to be used has a bulk density of at least 0.8 g/cm$^3$, an average particle diameter of 5 to 40 μm and an aluminum content of 35% by weight or less in terms of Al$_2$O$_3$. By the use of a blowing agent or the like, it is also possible to obtain a porous lightweight solid. As a consequence, there can be obtained a solid containing coal ash and having a high mixing ratio of coal ash, excellent dimensional stability to water, high strength and a decreased unevenness of the strength, and this kind of solid can be used in applications such as building materials, construction materials, artificial aggregates and the like. Furthermore, a laminated solid having not only the above-mentioned characteristics but also weight reduction properties can also be obtained, and this solid can be used to form building materials such as panels, blocks, bricks and boards for accoustic use, artificial lightweight aggregates and the like.

2 Claims, No Drawings

PROCESS FOR PREPARING SOLIDIFIED MATERIAL CONTAINING COAL ASH

BACKGROUND OF THE INVENTION

1. Field of the Invention

The present invention relates to a process for preparing a solidified material containing a coal ash as a main component which can be suitably used as building materials such as panels for building, construction materials such as roadbed materials and crushed stones, artificial aggregates, and the like.

2. Description of the Related Art

In thermal power plants and various factories utilizing coal as an energy source, a coal ash such as fly ash is produced in large quantities. About 4,000,000 tons of coal ash are produced each year in Japan, and only about 40% of such amount of the coal ash is being effectively utilized. The remaining 60% of the coal ash is presently being disposed of. However, it is not always easy to secure a disposal place for the coal ash, and owing to the compensation of fishery rights and the establishment of recycling laws, finding a disposal place is more and more difficult. Therefore, increasing the effective utilization of the coal ash is an urgent theme.

Heretofore, it has been suggested that the coal ash be utilized as an inorganic building material, as disclosed in Japanese Patent Application Laid-open Nos. 17247/1988 and 305044/1992. As a peculiar example, it has been suggested that the coal ash be utilized as one material for artificial fish gathering places, as shown in a publication "Construction of an artificial submarine mountain with a coal ash", Nippon Kogyo Shinbun K. K., Feb. 26, 1993. Of these suggestions, in the case that the coal ash is utilized as a construction material such as the material for artificial fish gathering places and as a building material, the use of a large amount of the coal ash can be expected.

By the way, in the case that the above-mentioned coal ash is utilized as a construction material such as the material for artificial fish gathering places or as a building material, the coal ash is usually mixed with cement and then used in either case. However, since a hydration reaction is utilized, the mixing ratio of the coal ash is not always high, though the coal ash is used as the main material. If it is intended to increase the mixing ratio of the coal ash up to 40% by weight or more, there is a problem that the strength of an obtained solid deteriorates, and for this reason, the utilization of the coal ash is at most 40% by weight. Furthermore, in this case, a large amount of cement is used, and so there is another problem that the dimensional stability of the solid in water is poor. This can be understood to be due to the fact that alight ($3CaO \cdot SiO_2$), belight ($2CaO \cdot SiO_2$) and the like are contained in a cement clinker, and the hydration reaction is carried out between these components and the coal ash to produce a calcium silicate hydrate gel (C-S-H) and calcium hydroxide, but since the rate of this hydration reaction is slow, the unreacted alight, belight and the like remain in large quantities in the solid. In addition, a large amount of calcium hydroxide is produced by the hydration reaction, but this hydrate is considered to have a bad influence on the dimensional stability.

Here, "the dimensional stability of the solid in water is poor" means that a volume change of the solid in dry-wet states is large.

A technique can also be contrived in which a composition of the coal ash and the cement is cured in an autoclave, but when 40% by weight or more of the coal ash is mixed, a solid having sufficient strength cannot be obtained even with autoclave curing.

Furthermore, in the case of building materials, weight reduction is required in addition to strength enhancement and the improvement of water resistance, depending upon the purpose for which the material is to be used. Generally, for the sake of weight reduction, the building material has been prepared by curing a cement slurry containing a blowing agent in an autoclave, and the thus obtained material is excellent in fire resistance, heat insulating properties and sound insulating properties, and it is further lightweight. Thus, this kind of material has been partially utilized as an autoclaved light weight concrete (ALC) in panels for building of houses and the like. Such a coal ash also has been partially utilized as the lightweight building material in ALC and the like. However, its mixing ratio is not always high, and when the mixing ratio of the coal ash is increased up to 40% by weight or more, the strength of the lightweight solid deteriorates. In addition, it also has the drawback that the dimensional stability to water is poor.

With regard to the utilization of the coal ash solid as the ALC, since the conventional ALC has a large porosity, there is a problem that a reinforcement material such as iron reinforcing rods is necessary in the case that the coal ash is used in, for example, a floor material which requires strength. Thus, it has been desired to develop ALC having sufficient strength even without using any reinforcement material.

In view of the above-mentioned problems of the conventional techniques, the present invention has been made, and an object of the present invention is to provide a solidified material containing a coal ash in a high mixing ratio and having a good dimensional stability to water, a high strength and a slight unevenness. Another object of the present invention is to provide a solid having weight reduction properties in addition to the above-mentioned characteristics.

SUMMARY OF THE INVENTION

In order to achieve the above-mentioned objects, the present invention has been completed. According to a first aspect of the present invention, there is provided a process for preparing a solidified material containing a coal ash which comprises a first step of mixing the coal ash with a calcium compound to obtain a mixture, and a second step of molding the mixture to obtain a molded article; the coal ash having a bulk density of 0.8 g/cm³ or more and an average particle diameter of 5 to 40 μm; the aluminum content in the coal ash being 35% by weight or less in terms of $Al_2O_3$; in the first step, 40 to 95 parts by weight of the coal ash being mixed with 60 to 5 parts by weight of the calcium compound; and after the second step, a third step being carried out in which the molded article obtained in the second step is subjected to a hydrothermal treatment at a temperature of 120° C. or more under high pressure.

Furthermore, according to a second aspect of the present invention, there is provided a process for preparing a solidified material containing a coal ash which comprises a first step of mixing the coal ash with a calcium compound to obtain a mixture, and a second step of molding the mixture to obtain a molded article; the coal ash having a bulk density of 0.8 g/cm³ or more and an average particle diameter of 5 to 40 μm; the aluminum content in the coal ash being 35% by weight or less in terms of $Al_2O_3$; in the first step, 40 to 90 parts by weight of the coal ash being mixed with 60 to 10 parts by weight of the calcium compound, a blowing agent or a foaming agent and water; and after the second step, a third step being carried out in which the molded article obtained in the second step is subjected to a hydrothermal treatment at a temperature of 120° C. or more under high pressure.

According to the third aspect of the present invention, there is provided a process for preparing a solidified material containing a coal ash which comprises a first step of mixing the coal ash with a calcium compound to obtain a mixture, and a second step of molding the mixture to obtain a molded article; the coal ash having a density of 0.8 g/cm$^3$ or more and an average particle diameter of 5 to 40 μm; the aluminum content in the coal ash being 35% by weight or less in terms of $Al_2O_3$; in the first step, 40 to 90 parts by weight of the coal ash being mixed with 60 to 10 parts by weight of the calcium compound and water, and air bubbles being blown into this mixture; and after the second step, a third step being carried out in which the molded article obtained in the second step is subjected to a hydrothermal treatment at a temperature of 120° C. or more under high pressure.

According to the fourth aspect of the present invention, there is provided a process for preparing a solidified material containing a coal ash which comprises a first step of mixing the coal ash with a calcium compound to obtain a mixture, and a second step of molding the mixture to obtain a molded article; the coal ash having a bulk density of 0.8 g/cm$^3$ or more and an average particle diameter of 5 to 40 μm; the aluminum content in the coal ash being 35% by weight or less in terms of $Al_2O_3$; in the first step, 10 to 90 parts by weight of the coal ash being mixed with 90 to 10 parts by weight of the calcium compound, a blowing agent or a foaming agent and water to obtain two or more mixtures which are different from each other in at least one respect selected from the group consisting of the kinds and amounts of coal ash, calcium compound, blowing agent or foaming agent, and water; in the second step, the two or more mixtures being molded in a laminate state; and after the second step, a third step being carried out in which the molded article obtained in the second step is subjected to a hydrothermal treatment at a temperature of 120° C. or more under a high pressure.

According to the fifth aspect of the present invention, there is provided a process for preparing a solidified material containing a coal ash which comprises a first step of mixing the coal ash with a calcium compound to obtain a mixture, and a second step of molding the mixture to obtain a molded article; the coal ash having a bulk density of 0.8 g/cm$^3$ or more and an average particle diameter of 5 to 40 μm; the aluminum content in the coal ash being 35% by weight or less in terms of $Al_2O_3$; in the first step, 10 to 90 parts by weight of the coal ash being mixed with 90 to 10 parts by weight of the calcium compound and water to obtain two or more mixtures which are different from each other in at least one respect selected from the group consisting of the kinds and amounts of coal ash, calcium compound and water, and a predetermined amount of air bubbles being blown into each of the two or more mixtures; in the second step, the two or more mixtures being molded in a laminate state; and after the second step, a third step being carried out in which the molded article obtained in the second step is subjected to a hydrothermal treatment at a temperature of 120° C. or more under high pressure.

In the process for preparing the solidified material containing the coal ash of the present invention, the molded article is preferably cured at 30° to 100° C., prior to the third step. Furthermore, as the above-mentioned calcium compound, there are preferably used one or more calcium compounds selected from the group consisting of calcium oxide, calcium hydroxide, calcium carbonate and calcium silicate. Here, the above-mentioned bulk density is a value measured in accordance with the procedure of JIS Z 2504.

DETAILED DESCRIPTION OF THE INVENTION

A process for preparing a solidified material containing a coal ash of the present invention comprises a first step of mixing the coal ash with a calcium compound to obtain a mixture, a second step of molding the mixture to obtain a molded article, and a third step of subjecting the molded article to a hydrothermal treatment.

At the point in time when the coal ash and the calcium compound are mixed and then molded, the respective fine particles are mutually dispersed, and particularly in the case that the water content is suitable, they closely adhere to one another. By the subsequent hydrothermal treatment, the $SiO_2$ component and the like in the coal ash are reacted with a calcium component of a calcium compound such as CaO and water to mainly produce tobermorite ($5CaO \cdot 6SiO_2 \cdot 5H_2O$) and a calcium silicate hydrate gel (a C-S-H gel) between the respective fine particles and on these particles. As a result, the solid becomes a hardened material having a small porosity and containing tobermorite crystals as a main component, the C-S-H gel, the coal ash particles and the like which mutually strongly adhere to each other.

Furthermore, when a blowing agent such as a metallic aluminum powder and water are added at the time of mixing the coal ash with the calcium compound, the $SiO_2$ component in the coal ash, the calcium component in the calcium compound and water are reacted with each other to produce the calcium silicate hydrate gel (the C-S-H gel) and calcium hydroxide, and this calcium hydroxide, the calcium compound, water and the blowing agent are reacted to generate a gas (usually hydrogen), whereby air bubbles are formed in the mixture. As a consequence, a soft structure containing water and many pores can be obtained. In this structure, it can be presumed that the C-S-H gel and the remaining coal ash particles constitute its skeleton. Even if a foaming agent is used in place of the blowing agent, a similar structure can be obtained. By the subsequent hydrothermal treatment, the C-S-H gel is reacted with the remaining coal ash particles to produce the tobermorite crystals, with the result that a porous lightweight hardened material (a lightweight solidified material) can be obtained.

The porosity of the solid can be controlled to a predetermined value by suitably changing the kind and amount of blowing agent or foaming agent, whereby the strength and the weight reduction state of the solid can be adjusted. In addition, the kind and amount of coal ash and calcium compound and the amount of water to be added can also be changed in consideration of the strength of the solid and the pouring properties of the solid at the time of molding. Several kinds of mixtures can be prepared which are different from each other in the kind or amount of blowing agent or foaming agent, the kind or amount of coal ash, the kind or amount of calcium compound and the amount of water, and these mixtures can then be molded into a laminate to obtain a strong and lightweight solid (a lightweight multilayer solid).

In the process of the present invention, it is preferred that the coal ash has a bulk density of 0.8 g/cm$^3$ or more, preferably 1.0 g/cm$^3$ or more. If the bulk density is less than 0.8 g/cm³, the strength of the solid cannot be sufficiently improved and the unevenness of the strength increases. The average particle diameter of the coal ash is preferably in the range of 5 to 40 μm, more preferably 10 to 30 μm. If the average particle diameter is less than 5 μm, sufficient strength cannot be exerted, and if it is more than 40 μm, the strength of the solid deteriorates and the unevenness of the strength increases.

These reasons are not definite, but it can be presumed that the coal ash contributes as an aggregate to the strength of the solid and most of the coal ash particles having small bulk density are hollow, which leads to the deterioration of strength and the increase in the unevenness of the strength. The coal ash having an average particle diameter less than 5 μm scarcely remains as the coal ash particles after an autoclave curing step which is the hydrothermal treatment, so that the coal ash does not contribute as the aggregate any more and so it does not lead to an improvement in strength. On the other hand, the coal ash having an average particle diameter of 40 μm remains as the coal ash particles even after the autoclave curing, but it can be supposed that the particle diameter of the remaining coal ash is too large and hence the coal ash conversely functions as a defect. The particle diameter distribution of the coal ash is preferably such that 60% of the particles are present in the range of ¼ to 4 times of the average particle diameter in order to improve the strength and to decrease the unevenness of the strength. As the coal ash which can be used, fly ash is preferable in terms of strength, but bottom ash can also be used after being subjected to a grinding treatment.

With regard to the composition of the coal ash, the aluminum content is preferably 35% by weight or less in terms of $Al_2O_3$, more preferably 30% by weight or less. If the aluminum content is in excess of 35% by weight, the strength of the solid deteriorates and the unevenness of the strength increases inconveniently. This can be considered to be due to the formation of hydrogarnet in the solid by the autoclave curing, and the formed hydrogarnet functions as a defect. With regard to the other components in the coal ash, the Si content is preferably in the range of 30 to 80% by weight in terms of $SiO_2$, and an Fe content is preferably 15% by weight or less in terms of $Fe_2O_3$ from the viewpoint of strength. Moreover, even if the unburned carbon content is 5% by weight or more, there is no problem at all. As the coal ash, there may be used not only the fine coal ash powder which can usually be formed but also the coal ash which can be formed by a combustion power generation system using a fluidized bed under atmospheric pressure or increased pressure.

It is necessary that the mixing ratio of the coal ash should be within the range of 40 to 95 parts by weight, more preferably 70 to 90 parts by weight. However, in the case that air bubbles are formed in the solid by the use of the blowing agent, the foaming agent or the like to obtain the lightweight solid, it is necessary that the mixing ratio of the coal ash should be within the range of 40 to 90 parts by weight, more preferably 50 to 80 parts by weight. Furthermore, in the case that the lightweight multi-layer solid is prepared, it is necessary that the mixing ratio of the coal ash should be within the range of 10 to 90 parts by weight, more preferably 30 to 80 parts by weight. If the mixing ratio of the coal ash is less than the lower limit of the above-mentioned range then, the strength and the dimensional stability of the solid are adversely affected, and if it is more than the upper limit of the range, solidification is difficult, so that a strong solid state cannot be maintained.

Examples of the calcium compound which can be employed in the present invention include calcium oxide, calcium hydroxide, calcium silicate and calcium carbonate. These compounds can be used either singly or a in combination of two or more. In view of the strength characteristics, the calcium compound is preferably used in the form of particles having a particle diameter of 500 μm or less. Here, examples of the calcium silicate include tricalcium silicate ($3CaO \cdot SiO_2$), dicalcium silicate ($2CaO \cdot SiO_2$) and the like, and various kinds of portland cements such as common portland cements containing these silicates can also be used. Among these compounds, calcium oxide, calcium hydroxide and calcium silicate are suitable from the viewpoint of a functional effect. Additionally, an ash formed by burning shells contains calcium oxide, and so it can be used in the present invention. However, calcium sulfate such as gypsum is not suitable for the present invention, because a product other than tobermorite will be formed.

When a lightweight solid or the lightweight multi-layer solid is intended, an aluminum powder, a calcium powder or a lime chloride powder can be used as the blowing agent, but the employment of the aluminum powder is preferred. In view of strength improvement, the amount of the blowing agent to be added is preferably in the range of 0.01 to 1% by weight based on the weight of the solid, and the particle diameter of the blowing agent is preferably in the range of 1 to 300 μm. Examples of the foaming agent which can be used in the present invention include detergents (anionic surface active agents such as sodium lauryl sulfate, alkylaryl sulfonates such as sodium dodecylbenzenesulfonate, alkylnaphthalenesulfonates and nonylphenoxydiethoxyethylsulfonates, and nonionic surface active agents such as alkylarylsulfonic acid, naphthalene alkylsulfonate, polyoxyethylene alkyl ethers, polyoxyethylene lauryl ether, fatty acid diethanol amides, polyoxyethylene lanolin alcohol ether and polyoxyethylene lanolin fatty acid esters), vegetable and animal glues, saponin, modified glue naphthalene butylsulfonate, sodium isopropylsulfonate, calcium chloride, alumina cement, other surface active agents (polyoxyethylene alkylamine ethers and the like), and protein derivatives such as gelatin and casein. The employment of an anionic or a nonionic surface active agent is preferable. The amount of the foaming agent to be used is preferred in the range of 0.01 to 1% by weight.

In order to mold the mixture obtained in the first step into a predetermined shape, it is preferable from the viewpoints of strength improvement and moldability of the solid to add a predetermined amount of water to the mixture. The thus prepared mixture is then molded into the predetermined shape by press molding, extrusion, casting, compaction molding or centrifugal compaction molding. The amount of water to be added is preferably in the range of 1 to 25% by weight for press molding, 15 to 30% by weight for extrusion, 20 to 45% by weight for casting, and 15 to 40% by weight for the compaction molding with respect to weight of solid. It is preferable to add 20 to 100% by weight of water, preferably warm water at 40° C. or more to the solid, because the strength of the solid can be improved and the air bubbles can be uniformly dispersed. In this case, the molding is preferably carried out by casting.

In the case that the foaming agent is used in place of the blowing agent, the coal ash is mixed with the calcium compound, and 20 to 100% by weight of water, preferably warm water at 40° C. is added to the solid to prepare the mixture (a slurry). Next, the foaming agent is added to this slurry, and the mixture is then vigorously stirred to generate air bubbles (a mix foam method). Alternatively, fine air bubbles previously formed by the use of the foaming agent may be introduced into the slurry prepared as described above (a prefoam method).

In preparing the mixture, a binder and admixtures (a water reducing agent, a water retaining agent, a waterproofing agent, a superplasticizer, a shrinkage reducing agent and the like) may be added, and for the sake of the improvement of the strength of the solid, the adjustment of specific gravity and the decrease of cost, there can be added siliceous sand, an igneous rock, blast furnace sludge, pearlite, scraps of ALC, glass fiber, fiber and pulp. Examples of the binder include methyl cellulose, ethyl cellulose, carboxylmethyl cellulose, hydroxyethyl cellulose and polyvinyl alcohol. Examples of the admixtures include alkylarylsulfonic acid, a high condensate of formalin naphthalenesulfonate, a co-condensate of naphthalenesulfonic acid and ligninsulfonic acid, an alkylarylsulfonate polymer, an alkylarylsulfonate, a condensate of diethylnaphthalene and formalin, a co-condensate of an olefin and maleic anhydride, a polycarbonate and a modified methylol melamine condensate. In the case that the lightweight solid or the light-weight multi-layer solid is formed by the use of the blowing agent, a foam stabilizer and the surface active agent may be added.

In the case of casting, compaction molding or the like, the solid can be reinforced by casting the slurry into a frame in which a reinforcement such as iron reinforcing rods has previously been set up.

In the case of casting, compaction molding or press molding, slurries and particles having different components can be divided into several portions and then cast into the frame, thereby obtaining a solid having a laminate structure which comprises many layers of different components. As a consequence, the surface of the solid can be colored, and so the thus colored solid can be applied to pedestrian plates for roads, building materials and the like in which appearance is regarded as important. If the amount of an aggregate or the porosity is continuously changed, a solid having the inclination of the strength can be obtained.

A lightweight multi-layer solid comprising many layers having different porosities can be prepared by pouring slurries having different kinds and different amounts of blowing agent into the mold in turn. The pouring time of each slurry should be within 2 hours from the viewpoint of strength. In consideration of strength and water absorption, the slurry which is poured to the outer surface portion of the mold (the upper surface portion or bottom surface portion of the mold) preferably contains neither the blowing agent nor the foaming agent. It is preferable in terms of strength that the porosity distribution of the solid continuously changes, and hence regulation is preferably made so that the amounts of the blowing agent or the foaming agent in the respective slurries may continuously change. The distribution of the porosity can be mainly classified into 4 types, i.e., (1) a type in which the porosity between two layers of the solid changes in the state of a low level→a high level, (2) a type in which the porosity between the two layers changes in the state of a low level→a high level→a low level, (3) a type in which the porosity between the two layers changes in the state of a high level→a low level→a high level, and (4) a mixed type of the above-mentioned (1), (2) and (3). The above-mentioned type (2) is not suitable for outdoor use, because the dimensional stability and strength are slightly poorer than any other type. In addition, a solid having some layers in a direction vertical to the bottom surface can also be prepared by putting some dividers in the frame. In the case that the blend ratio of the coal ash to the calcium compound is changed every layer, it is preferable in terms of strength to continuously change the blend ratio.

As described above, the soft structure having different porosities, pore diameters or pore shapes in some portions thereof in the state of the foamed solid can be obtained by molding a plurality of slurries having different porosities and components into a laminate. It can be presumed that in this structure, the C-S-H gel and the remaining coal ash particles form a skeleton.

The strength of the thus formed structure can be enhanced by the crystalline tobermorite-produced by the reaction of the C-S-H gel with the remaining coal ash particles in a subsequent autoclave curing step. Finally, many pores are dispersed in a matrix containing the tobermorite as a main component, the coal ash particles and the C-S-H gel to obtain the structure in which the porosity, the pore diameter or the pore shape is different in its respective portions.

In the case of casting or compaction molding, during pouring of the slurry into the mold, the mold can be vibrated so as to inhibit the introduction of air bubbles by the pouring, which is preferable to improve the strength and to maintain the shape of the molded article. With regard to the vibration, the amplitude is preferably in the range of 0.1 to 5 mm, and the oscillation frequency is preferably in the range of 500 to 50 Hz.

In the process for preparing the solid according to the present invention, the molded article which has been obtained by the above-mentioned procedure is subjected to a hydrothermal treatment, but as this hydrothermal treatment, an autoclave treatment is usually carried out. It is necessary that the treatment of the temperature by the autoclave is 120° C. or higher, more preferably 130° to 250° C. The treatment time is preferably 2 hours or longer, more preferably 5 hours or longer. When the temperature of saturated vapor is 120° C., the absolute pressure is about 2 kg/cm$^2$. In the case that the treatment temperature is lower than 120° C., the strength of the solid cannot be sufficiently improved, and the dimensional stability to water also deteriorates.

This can be considered to be due to the fact that tobermorite which has a strength improvement effect, is not sufficiently produced and calcium hydroxide and calcium silicate which adversely influence the dimensional stability remain in large quantities. In this connection, the C-S-H gel also seems to take part in the deterioration of the dimensional stability. At a treatment temperature of less than 120° C., the production of tobermorite is insufficient, and instead the amount of the remaining C-S-H gel increases. The water content in the C-S-H gel depends largely upon whether it is in a dry or a wet state, and thus it can be presumed that the volume of the solid largely varies with the water content, so that the dimensional stability deteriorates. The reason why the dimensional stability tends to deteriorate in the case of the low mixing ratio of the coal ash can be considered to be due to the fact that calcium hydroxide, calcium silicate and the C-S-H gel remain in large quantities in the solid. It is not preferred that the autoclave treatment is carried out while the molded article is immersed in water. When the blowing agent or the like is used, it is preferable in terms of strength and dimensional stability that the autoclave treatment is carried out after the completion of the foaming.

In particular, when calcium carbonate is used as the calcium compound, the strength and particularly a freeze-thaw resistance can be improved by doing the autoclave treatment underconditions where an alkali is present. This reason is not definite, but it can be supposed that the reaction of the coal ash with the calcium compound is accelerated in the presence of the alkali, so that the reaction product such as tobermorite tightly adheres. Examples of the alkali include hydroxides of alkali metals (NaOH, KOH and the like), carbonates of the alkali metals ($Na_2CO_3$ and the like) and ammonia. Of these compounds, the hydroxides of the alkali metals, ammonia and the carbonates of the alkali metals are preferable in this order from the viewpoint of a functional effect. Among them, the hydroxides of the alkali metals are preferred, and above all, sodium hydroxide is most preferred. The alkali content is preferably in the range of 0.001 to 20% by weight, more preferably 0.1 to 10% by weight with respect to the weight of the coal ash in the molded article. By adjusting the alkali content in this range, a solid which is excellent in strength, dimensional stability and freeze-thaw resistance can be obtained. The alkali can be introduced into the molded article by a means of adding an alkali powder or an aqueous alkali solution to the above-mentioned mixture or by means of impregnating the molded article with the aqueous alkali solution, with the latter means being preferred.

Prior to the hydrothermal treatment, the molded article can be cured at 30° to 100° C., preferably at 40° to 90° C. for 2 hours or longer, preferably 5 hours or longer to improve the strength of the solid. Furthermore, the hydrothermal treatment can be advantageously given to the solid removed from the mold. When the blowing agent or the foaming agent is used, the curing time is preferably set to 1 hour or longer, and, more preferably is 3 hours or longer. In this case, the time taken until a semi-plastic state (which is such a solidification state that the article can be removed from the mold and can be cut with a piano wire) has been reached can be shortened, and so there is an advantage that the pores can be uniformly dispersed. Furthermore, when the blowing agent is used, the foaming can be promptly completed. As the curing technique, there are wet curing, fresh water curing, spray curing, film curing and the like, but the wet curing and the fresh water curing are preferred.

Since the coal ash solid obtained by the process of the present invention has a high compressive strength, for example, 400 kg/cm$^2$ or higher and a decreased unevenness of strength, the solid can be applied to concrete articles such as concrete panels and concrete stakes in which high strength is required. Furthermore, because the coal ash solid has good dimensional stability to water, it is possible to use the same in a watering place. Therefore, when the coal ash solid obtained by the process of the present invention is ground into a predetermined particle diameter by a roll crusher, a jaw crusher or the like, the ground solid can be utilized in large quantities in many fields as aggregates such as panels for building, construction materials such as roadbed materials and crushed stones, artificial aggregates and the like. Thus, the utilization of a large amount of the coal ash is possible. In addition, the lightweight multi-layer solid obtained by the process of the present invention can be utilized as construction materials such as water-permeable pedestrian plates.

In the case that the blowing agent or the foaming agent is used, the solid can possess a structure in which many pores are dispersed in a matrix containing tobermorite as a main component, the coal ash particles and the C-S-H gel. The thus obtained solid has high strength and a small unevenness of strength, though it contains many pores therein. The solid is also excellent in dimensional stability to water and is so lightweight that its absolute dry bulk density is 1.0 or less in the case of a lightweight solid and 1.2 or less in the case of a lightweight multi-layer solid.

The solid containing air bubbles has excellent sound absorbing properties, sound insulating properties, heat insulating properties and non-combustibility. In general, an acoustic material which is excellent in sound absorbing properties has a high porosity and so it is low in strength (e.g., compressive strength=about 10 kg/cm$^2$). Accordingly, the solid has been presently placed in a support such as an iron frame to compensate for the lack of the strength. The lightweight multi-layer solid of the present invention exhibits excellent sound absorbing properties and has high strength, and therefore it can be used without the support. Thus, the lightweight multi-layer solid can be used to manufacture an article simultaneously having two mechanisms of a wall material and a sound absorbing material. Therefore, the number of steps for the manufacturing process can be remarkably reduced, which is advantageous in terms of cost.

In order to use the solid as an absorbing plate, the absolute dry bulk density of the solid is preferably in the range of 0.2 to 0.5. The pores in the solid have an average pore diameter of 100 to 1000 μm, and the respective pores preferably communicate with each other. The communication of the pores can be achieved by setting the absolute dry bulk density of the solid to 0.2 to 0.5 and by adding the following surface active agent together with the blowing agent or the foaming agent to the slurry. Examples of the surface active agent include polyoxyethylene alkyl ethers and their salts, polyoxyethylene nonylphenyl ethers and their salts, alkylbenzenesulfonates, fatty acid diethanoi amides, alkylsulfates, sulfonates, soaps, water glass, resins and saponin. Furthermore, it is preferable to add an air bubble stabilizer such as polyvinyl alcohol or methyl cellulose.

As is apparent from the aforesaid description, according to the present invention, a solid containing a coal ash can be obtained which has a high mixing ratio of the coal ash, good dimensional stability to water, high strength, and a limited unevenness of strength. Thus, the solid of the present invention can be applied to many fields such as building materials, construction materials, artificial aggregates and the like. Furthermore, a laminated solid having the above-mentioned characteristics, weight reduction properties, a different pore distribution and the like can also be obtained, and this kind of laminated solid can be suitably applied to building materials such as panels, blocks, bricks and acoustic plates, artificial lightweight aggregates and the like. As a consequence, the present invention relieves the problem of disposing of coal ash which is an industrial waste, by providing a method of making a solid the main component of which is coal ash. Hence, the present invention is extremely significant.

Next, the present invention will be described in more detail with reference to examples, but the scope of the present invention should not be limited to these examples.

EXAMPLES 1 TO 16

Fly ash having a bulk density of 0.8 to 1.4 g/cm$^3$ and an average particle diameter of 5 to 40 μm (components: 30–80% by weight of $SiO_2$, 18–35% by weight of $Al_2O_3$ and 15% by weight or less of $Fe_2O_3$) was used as the coal ash, and 4 kinds of calcium oxide, calcium hydroxide, calcium carbonate and common portland cement having an average particle diameter of 1 to 100 μm were used as calcium compounds. These materials were mixed in various weight ratios, and 10 to 30% by weight of water and a water reducing agent were further added thereto, thereby obtaining various kinds of mixtures.

Each mixture was subjected to press molding or casting to obtain molded articles having a disc shape (diameter=120 mm and thickness=50 mm). In the case of press molding, the articles were molded under a press pressure of 50 kg/cm$^2$, and curing was then carried out at 60° C. for 20 hours in a wet condition. In the case of casting, a slurry was cast into a mold, and curing was then carried out at 60° C. for 20 hours in a wet condition. Next, the thus molded articles were subjected to an autoclave treatment at 120° to 270° C. for 20 hours to prepare solids containing the coal ashes.

Table 1 shows bulk densities and average particle diameters of the coal ashes, aluminum contents in the coal ashes, kinds of calcium compounds, blend amounts of the coal ashes and the calcium compounds, and temperatures of the autoclave treatment. In this connection, in Examples 1 and 13, curing in the wet condition was not done.

For the thus obtained solids, appearance was observed, and compressive strength and dimensional stability to water were also measured. Table 1 shows the results of these tests. The tests were carried out by the following procedures.

With regard to the appearance of the respective solids, the state of damage such as cracks and the state of shape retention were observed, and the solids having a good appearance were judged to be o, and a solids having the bad appearance were judged to be x.

The compressive strength was measured by setting metal plates having a diameter of 50 mm to the upper and lower surfaces of each disc, and then applying a certain pressure to the metal plates in accordance with JIS A 1108. The average of the measured values of 10 samples was regarded as the compressive strength, and its standard deviation was regarded as unevenness.

The dimensional stability was measured in accordance with JIS A 5418. Samples for the measurement having a size of 40×50×100 mm were cut out from the obtained solids, and these samples were placed in a drying oven and then dried at 60° C. for 24 hours. Afterward, the samples were cooled to ambient temperature in a desiccator and then immersed in water at ordinary temperature for 24 hours. Next, the dimensional change of each sample was measured and expressed in percent.

TABLE 1 (I)

| | Material Component (wt %) Coal Ash | | | |
|---|---|---|---|---|
| Example | Amount of Coal Ash (wt %) | Bulk Density (g/cm$^3$) | Average Particle Diameter (μm) | Amount of Al$_2$O$_3$ (wt %) |
| 1 | 95 | 1.1 | 13 | 21 |
| 2 | 90 | 1.3 | 22 | 30 |
| 3 | 85 | 0.8 | 18 | 26 |
| 4 | 85 | 1.4 | 20 | 23 |
| 5 | 80 | 1.0 | 5 | 29 |
| 6 | 80 | 1.1 | 10 | 30 |
| 7 | 70 | 1.2 | 40 | 18 |
| 8 | 70 | 1.1 | 16 | 18 |
| 9 | 75 | 1.0 | 29 | 35 |
| 10 | 75 | 1.1 | 27 | 25 |
| 11 | 70 | 1.3 | 12 | 21 |
| 12 | 70 | 1.3 | 10 | 20 |
| 13 | 80 | 1.1 | 30 | 24 |
| 14 | 80 | 1.1 | 30 | 23 |
| 15 | 40 | 1.3 | 16 | 20 |
| 16 | 70 | 1.2 | 27 | 22 |

TABLE 1 (II)

| Example | Material Component (wt %) Ca Compound (kind and wt %) | | Autoclave Curing Temp. (°C.) |
|---|---|---|---|
| 1 | 2 (a) | 3 (b) | 160 |
| 2 | 10 (a) | | 180 |
| 3 | 15 (b) | | 180 |
| 4 | 15 (b) | | 180 |
| 5 | 20 (c) | | 160 |
| 6 | 20 (c) | | 160 |
| 7 | 15 (a) | 15 (b) | 140 |
| 8 | 15 (a) | 15 (b) | 140 |
| 9 | 20 (b) | 5 (c) | 150 |
| 10 | 20 (b) | 5 (c) | 150 |
| 11 | 20 (c) | 10 (d) | 140 |
| 12 | 20 (c) | 10 (a) | 140 |
| 13 | 20 (b) | | 270 |
| 14 | 20 (b) | | 200 |
| 15 | 30 (a) | 30 (b) | 140 |
| 16 | 30 (b) | | 120 |

Note:
In the item of Ca Compound, (a) means common portland cement, (b) means CaO, and (c) means gypsum.

TABLE 1 (III)

| | Characteristics | | | |
|---|---|---|---|---|
| | | Compressive Strength (kg/cm$^2$) | | Dimensional |
| Example | Appearance | Compressive Strength | Unevenness | Stability (%) |
| 1 | o | 401 | 15 | 0.016* |
| 2 | o | 590 | 19 | 0.010 |
| 3 | o | 532 | 25 | 0.010 |
| 4 | o | 683 | 21 | 0.009 |
| 5 | o | 598 | 20 | 0.011 |
| 6 | o | 737 | 25 | 0.008 |
| 7 | o | 715 | 29 | 0.013 |
| 8 | o | 806 | 25 | 0.011 |
| 9 | o | 659 | 29 | 0.014 |
| 10 | o | 774 | 25 | 0.013 |
| 11 | o | 682 | 29 | 0.016 |
| 12 | o | 761 | 20 | 0.012 |
| 13 | o | 588 | 20 | 0.019* |
| 14 | o | 701 | 22 | 0.010 |
| 15 | o | 696 | 21 | 0.017 |
| 16 | o | 510 | 19 | 0.015 |

*The curing was not carried out.

EXAMPLES 17 TO 35

Slurries for molding were prepared under conditions that the mixing ratio of coal ashes was set to 40–90% by weight, the mixing ratio of calcium compounds was set to 60–10% by weight, and after the mixing of a blowing agent, water was added thereto in an amount of 20 to 100% by weight based on the weight of the solid content. Fly ash having a bulk density of 0.8 to 1.4 g/cm$^3$ and an average particle diameter of 5 to 40 μm (components: 30–80% by weight of $SiO_2$, 19–35% by weight of $Al_2O_3$ and 15% by weight or less of $Fe_2O_3$) was used as the coal ash, and 4 kinds of calcium oxide, calcium hydroxide, calcium carbonate and common portland cement were used as the calcium compounds. Furthermore, as blowing agents, an aluminum powder and a calcium powder were used in an amount of 0.01 to 1% by weight based on the weight of the solid content. Each slurry was poured into a mold, and then foamed and cured at 40° to 90° C. for 20 hours in a wet state, followed by solidification. However, in Examples 26, 30 and 31, the foaming was made at ambient temperature without curing. The thus obtained solids were then subjected to an autoclave treatment at 120° to 270° C. for 20 hours to prepare lightweight solids containing the coal ashes.

Table 2 shows bulk densities and average particle diameters of the coal ashes used in the respective examples, aluminum contents in the coal ashes, kinds of calcium compounds, blend amounts of the coal ashes and the calcium compounds, and temperatures of the autoclave treatment.

For the thus obtained solids (40×40×160 mm), appearance was observed, and compressive strength, absolute dry bulk density and dimensional stability to water were also measured. Table 2 shows the results of these tests. The tests were carried out by the following procedures.

The appearance was judged by the same procedure as in Examples 1 to 16.

The compressive strength was measured by setting metal plates having a diameter of 50 mm to the upper and lower surfaces of each rectangular parallelepiped, and then applying a certain pressure to the metal plates in accordance with JIS A 1108, as in Examples 1 to 16.

The dimensional stability was measured in accordance with the procedure of JIS A 5418. Samples were placed in a drying oven and then dried at 60° C. for 24 hours, and afterward, the samples were cooled to ambient temperature in a desiccator and then allowed to absorb water at 20° C. for 3 days. After measurement of the dimensions, the samples were allowed to stand at a temperature of 20° C. and a relative humidity of 60%, and when the water content in each sample was 40% or less, the dimensions of the sample were measured. On the basis of the measured dimension values of each sample before and after the water absorption, the dimensional change of each sample was expressed in percent.

The absolute dry bulk density of the solids was measured in accordance with JIS A 5416.

TABLE 2 (I)

| Example | Material Component (wt %) Coal Ash | | | |
|---|---|---|---|---|
| | Amount of Coal Ash (wt %) | Bulk Density (g/cm³) | Average Particle Diameter (μm) | Amount of $Al_2O_3$ (wt %) |
| 17 | 90 | 1.2 | 15 | 24 |
| 18 | 80 | 1.3 | 10 | 25 |
| 19 | 80 | 0.8 | 11 | 20 |
| 20 | 80 | 1.4 | 13 | 21 |
| 21 | 50 | 1.0 | 5 | 30 |
| 22 | 50 | 1.0 | 15 | 29 |
| 23 | 70 | 1.2 | 40 | 30 |
| 24 | 70 | 1.3 | 25 | 28 |
| 25 | 70 | 1.0 | 24 | 35 |
| 26 | 80 | 0.9 | 10 | 24 |
| 27 | 60 | 1.3 | 30 | 30 |
| 28 | 60 | 1.3 | 29 | 28 |
| 29 | 70 | 1.2 | 26 | 29 |
| 30 | 80 | 1.0 | 11 | 24 |
| 31 | 50 | 1.3 | 7 | 33 |
| 32 | 40 | 1.3 | 16 | 30 |
| 33 | 55 | 1.3 | 18 | 28 |
| 34 | 65 | 1.1 | 22 | 19 |
| 35 | 65 | 1.1 | 24 | 20 |

TABLE 2 (II)

| Example | Material Component (wt %) Ca Compound (kind and wt %) | | | Autoclave Curing Temp. (°C.) | Characteristics Appearance |
|---|---|---|---|---|---|
| 17 | 10 (a) | | | 130 | o |
| 18 | 20 (b) | | | 130 | o |
| 19 | 10 (a) | 10 (c) | | 200 | o |
| 20 | 10 (a) | 10 (c) | | 200 | o |
| 21 | 40 (a) | 10 (b) | | 180 | o |
| 22 | 40 (a) | 10 (b) | | 180 | o |
| 23 | 10 (a) | 10 (b) | 10 (c) | 150 | o |
| 24 | 10 (a) | 10 (b) | 10 (c) | 150 | o |
| 25 | 30 (c) | | | 150 | o |
| 26 | 20 (a) | | | 130 | o |
| 27 | 20 (a) | 20 (d) | | 160 | o |
| 28 | 20 (a) | 20 (b) | | 160 | o |
| 29 | 30 (b) | | | 270 | o |
| 30 | 20 (a) | | | 160 | o |
| 31 | 20 (a) | 30 (c) | | 160 | o |
| 32 | 30 (a) | 30 (b) | | 180 | o |
| 33 | 25 (a) | 20 (b) | | 180 | o |
| 34 | 20 (a) | 15 (b) | | 120 | o |
| 35 | 20 (a) | 15 (b) | | 180 | o |

Note:
In the item of Ca Compound, (a) means common portland cement, (b) means CaO, and (c) means gypsum.

TABLE 2 (III)

| Example | Characteristics | | | |
|---|---|---|---|---|
| | Absolute Dry Bulk Density | Compressive Strength (kg/cm²) | | Dimensional Stability (%) |
| | | Compressive Strength | Unevenness | |
| 17 | 1.00 | 230 | 26 | 0.015 |
| 18 | 0.90 | 232 | 22 | 0.008 |
| 19 | 0.81 | 164 | 18 | 0.011 |
| 20 | 0.79 | 187 | 16 | 0.012 |
| 21 | 0.35 | 41 | 5 | 0.026 |
| 22 | 0.36 | 53 | 4 | 0.024 |
| 23 | 0.74 | 144 | 17 | 0.016 |
| 24 | 0.72 | 166 | 12 | 0.014 |
| 25 | 0.60 | 100 | 12 | 0.019 |
| 26 | 0.85 | 194 | 22 | 0.013* |
| 27 | 0.50 | 71 | 8 | 0.021 |
| 28 | 0.51 | 83 | 6 | 0.017 |
| 29 | 0.73 | 142 | 12 | 0.016 |
| 30 | 1.00 | 263 | 29 | 0.013* |
| 31 | 0.63 | 99 | 12 | 0.019* |
| 32 | 0.30 | 35 | 3 | 0.029 |
| 33 | 0.30 | 39 | 3 | 0.023 |
| 34 | 0.45 | 58 | 5 | 0.026 |
| 35 | 0.46 | 70 | 6 | 0.018 |

*The curing was not carried out.

EXAMPLES 36 TO 49

In each example, 3 kinds of slurries were obtained in which the mixing ratios of coal ash to calcium compounds and the kinds of blowing agents were different. Each slurry was obtained by mixing the coal ash with the calcium compound, further mixing a blowing agent in an amount of 0 to 0.7% by weight based on the weight of the solid content, and then adding water in an amount of 20 to 100% by weight based on the weight of the solid content. Fly ash having a bulk density of 0.8 g/cm³ or more and an average particle diameter of 5 to 40 μm (components: 30–80% by weight of $SiO_2$, 35% by weight or less of $Al_2O_3$ and 15% by weight or less of $Fe_2O_3$) was used as the coal ash, and 4 kinds of calcium oxide, calcium hydroxide, calcium carbonate and common portland cement were used as the calcium compounds. Furthermore, as the blowing agents, an aluminum powder and a calcium powder were used.

Each of the 3 kinds of slurries was poured into a mold (bottom surface=90×150 mm) to form 3 layers, and foaming and curing were then carried out at 40° to 90° C. for 20 hours in a wet state, followed by solidification. In Examples 36 to 45, the thickness of the respective layers was set to 30 mm, and in Examples 46 and 47, the thicknesses of the first, second and third layers were set to 10 mm, 70 mm and 10 mm, respectively. Moreover, in Examples 48 and 49, the thicknesses of the first, second and third layers were set to 20 mm, 50 mm and 20 mm, respectively. In Examples 44 and 49, curing was not made prior to molding, and foaming was carried out at ambient temperature. The molded solids were subjected to an autoclave treatment at a temperature of 100° C. or more for 20 hours to prepare lightweight multilayer solids containing the coal ash and having 3 layers.

Tables 3 and 4 show the kinds of calcium compounds, the blend amounts of the coal ash and the calcium compounds, and the amounts of the blowing agent to be added to every layer. In addition, the temperatures of the autoclave treatment are also shown.

For the thus obtained solids (90×90×150 mm), appearance was observed, and compressive strength and absolute dry bulk density were also measured. Tables 3 and 4 show the results of these tests. The tests were carried out by the following procedures.

With regard to the appearance of the respective solids, judgement was made by the same procedure as in Examples 1 to 16.

The compressive strength was measured by setting metal plates of 90×90 mm to the upper and lower surfaces of each rectangular parallelepiped, and then applying a certain pressure to the metal plates in accordance with JIS A 1108, as in Examples 1 to 16.

The absolute dry bulk density of the solids was measured in accordance with JIS A 5416.

TABLE 3 (I)

| Example | Material Component (wt %) | | | | Autoclave |
|---|---|---|---|---|---|
| | Ca Compund (kind and wt %) | | Coal Ash | Blowing Agent | Curing Temp. (°C.) |
| 36 | 45 (a) | 45 (b) | 10 | 0.00 | 130 |
| | 45 (a) | 45 (b) | 10 | 0.20 | 130 |
| | 45 (a) | 45 (b) | 10 | 0.35 | 130 |
| 37 | 40 (a) | 30 (b) | 30 | 0.00 | 130 |
| | 40 (a) | 30 (b) | 30 | 0.05 | 130 |
| | 40 (a) | 30 (b) | 30 | 0.19 | 130 |
| 38 | 50 (a) | | 50 | 0.00 | 150 |
| | 30 (a) | 20 (c) | 50 | 0.07 | 150 |
| | 20 (a) | 30 (c) | 50 | 0.30 | 150 |
| 39 | 20 (a) | | 80 | 0.00 | 180 |
| | 20 (a) | | 80 | 0.07 | 180 |
| | 20 (a) | | 80 | 0.27 | 180 |
| 40 | 10 (a) | | 90 | 0.00 | 200 |
| | 10 (b) | | 90 | 0.07 | 200 |
| | 10 (b) | | 90 | 0.25 | 200 |
| 41 | 40 (b) | 30 (d) | 30 | 0.00 | 150 |
| | 40 (b) | 30 (d) | 30 | 0.30 | 150 |
| | 40 (b) | 30 (d) | 30 | 0.70 | 150 |
| 42 | 30 (a) | 20 (c) | 50 | 0.00 | 150 |

TABLE 3 (I)-continued

| Example | Material Component (wt %) | | | | Autoclave |
|---|---|---|---|---|---|
| | Ca Compund (kind and wt %) | | Coal Ash | Blowing Agent | Curing Temp. (°C.) |
| | 30 (a) | 30 (b) | 40 | 0.05 | 150 |
| | 30 (a) | 40 (b) | 30 | 0.20 | 150 |
| 43 | 30 (a) | | 70 | 0.00 | 120 |
| | 30 (b) | | 70 | 0.04 | 120 |
| | 30 (b) | | 70 | 0.26 | 120 |

Note 1:
In the item of Ca Compound, (a) means common portland cement, (b) means CaO, (c) means Ca(OH)$_2$, and (d) means CaCO$_3$.
Note 2:
In the item of Material Component, the order of pouring is denoted by upper, middle and lower steps.

TABLE 3 (II)

| | Characteristics | | | |
|---|---|---|---|---|
| | | Absolute | Compressive Strength (kg/cm$^2$) | |
| Example | Appearanc | Dry Bulk Density | Compressive Strength | Unevenness |
| 36 | o | 1.0 | 310 | 32 |
| 37 | o | 1.2 | 473 | 29 |
| 38 | o | 1.0 | 482 | 31 |
| 39 | o | 0.9 | 360 | 25 |
| 40 | o | 0.9 | 250 | 29 |
| 41 | o | 0.9 | 304 | 32 |
| 42 | o | 1.1 | 498 | 30 |
| 43 | o | 1.1 | 264 | 28 |

TABLE 4 (I)

| Example | Material Component (wt %) | | | | Autoclave |
|---|---|---|---|---|---|
| | Ca Compund (kind and wt %) | | Coal Ash | Blowing Agent | Curing Temp. (°C.) |
| 44 | 50 (a) | | 50 | 0.00 | 250 |
| | 30 (a) | 20 (b) | 50 | 0.07 | 250 |
| | 20 (a) | 30 (b) | 50 | 0.30 | 250 |
| 45 | 50 (a) | | 50 | 0.00 | 150 |
| | 30 (a) | 20 (b) | 50 | 0.07 | 150 |
| | 20 (a) | 30 (b) | 50 | 0.30 | 150 |
| 46 | 60 (a) | | 40 | 0.00 | 180 |
| | 30 (a) | 30 (b) | 40 | 0.30 | 180 |
| | 60 (a) | | 40 | 0.00 | 180 |
| 47 | 40 (a) | | 60 | 0.00 | 200 |
| | 25 (b) | 25 (c) | 50 | 0.19 | 200 |
| | 40 (a) | | 60 | 0.00 | 200 |
| 48 | 20 (a) | 20 (b) | 60 | 0.20 | 160 |
| | 20 (a) | 20 (b) | 60 | 0.00 | 160 |
| | 20 (a) | 20 (b) | 60 | 0.20 | 160 |
| 49 | 20 (a) | 20 (b) | 60 | 0.20 | 180 |
| | 20 (a) | 20 (b) | 60 | 0.00 | 180 |
| | 20 (a) | 20 (b) | 60 | 0.20 | 180 |

Note 1:
In the item of Ca Compound, (a) means common portland cement, (b) means CaO and (c) means Ca(OH)$_2$.
Note 2:
In the item of Material Component, the order of pouring is denoted by upper, middle and lower steps.

TABLE 4 (II)

| | Characteristics | | |
|---|---|---|---|
| | | Compressive Strength (kg/cm$^2$) | |
| Example | Appearance | Absolute Dry Bulk Density | Compressive Strength | Unevenness |
| 44 | o | 1.0 | 313 | 33* |
| 45 | o | 0.9 | 325 | 35 |
| 46 | o | 0.6 | 421 | 26 |
| 47 | o | 0.7 | 433 | 27 |
| 48 | o | 1.1 | 500 | 46 |
| 49 | o | 1.0 | 354 | 34* |

*The curing was not carried out.

Comparative Examples 1 to 9

Fly ash having a bulk density of 0.5 to 1.2 g/cm$^3$ and an average particle diameter of 1 to 60 μm (components: 30–80% by weight of $SiO_2$, 18–40% by weight of $Al_2O_3$ and 15% by weight or less of $Fe_2O_3$) was used as the coal ash, and 4 kinds of calcium oxide, calcium hydroxide, calcium carbonate and common portland cement having an average particle diameter of 1 to 100 μm were used as calcium compounds, and they were mixed in various weight ratios. Next, 10 to 30% by weight of water and a water reducing agent were added and mixed to obtain various kinds of mixtures.

These mixtures were used in the same manner as in Examples 1 to 16, thereby preparing solids containing the coal ashes.

Table 5 shows bulk densities and average particle diameters of the coal ashes used in the respective comparative examples, aluminum contents in the coal ashes, kinds of calcium compounds, blend amounts of the coal ashes and the calcium compounds, and temperatures of the autoclave treatment. In Comparative Example 24, the solid was cured at 60° C. for 20 hours without doing the autoclave curing.

For the thus obtained solids, appearance was observed, and compressive strength and dimensional stability in water were also measured. Table 5 shows the results of these tests. The tests were carried out by the same procedures as in Examples 1 to 16.

TABLE 5 (I)

| | Material Component (wt %) Coal Ash | | | |
|---|---|---|---|---|
| Comp. Example | Amount of Coal Ash (wt %) | Bulk Density (g/cm$^3$) | Average Particle Diameter (μm) | Amount of $Al_2O_3$ (wt %) |
| 1 | 100 | 1.1 | 13 | 21 |
| 2 | 85 | 0.5 | 20 | 23 |
| 3 | 80 | 1.2 | 1 | 24 |
| 4 | 80 | 1.1 | 60 | 30 |
| 5 | 70 | 1.1 | 16 | 40 |
| 6 | 70 | 1.2 | 16 | 18 |
| 7 | 80 | 1.1 | 30 | 24 |
| 8 | 80 | 1.1 | 30 | 23 |
| 9 | 30 | 0.8 | 16 | 20 |

TABLE 5 (II)

| Example | Material Component (wt %) Ca Compound (kind and wt %) | | Autoclave Curing Temp. (°C.) |
|---|---|---|---|
| 1 | — | | 180 |
| 2 | 15 (b) | | 180 |
| 3 | 20 (c) | | 160 |
| 4 | 20 (c) | | 160 |
| 5 | 15 (a) | 15 (b) | 140 |
| 6 | 30 (e) | | 140 |
| 7 | 20 (b) | | 100 |
| 8 | 20 (b) | | Vapor Curing |
| 9 | 70 (a) | | 140 |

Note:
In the item of Ca Compound, (a) means common portland cement, (b) means CaO, and (c) means gypsum.

TABLE 5 (III)

| | | Characteristics | | |
|---|---|---|---|---|
| | | Compressive Strength (kg/cm$^2$) | | Dimensional |
| Comp. Example | Appearance | Compressive Strength | Unevenness | Stability (%) |
| 1 | x | — | — | — |
| 2 | o | 227 | 50 | 0.019 |
| 3 | o | 299 | 30 | 0.014 |
| 4 | o | 306 | 51 | 0.016 |
| 5 | o | 360 | 61 | 0.018 |
| 6 | x | — | — | — |
| 7 | o | 195 | 31 | 0.031 |
| 8 | x | — | — | — |
| 9 | o | 441 | 45 | 0.040 |

Comparative Examples 10 to 18

Slurries for molding were prepared under conditions that the mixing ratio of the coal ash was set to 30–100% by weight, the mixing ratio of the calcium compound was set to 70–0% by weight, and after the mixing of a blowing agent, water was added thereto in an amount of 20 to 100% by weight based on the weight of the solid content. Fly ash having a bulk density of 0.5 to 1.4 g/cm$^3$ and an average particle diameter of 1 to 60 μm (components: 30–80% by weight of $SiO_2$, 24–40% by weight of $Al_2O_3$ and 15% by weight or less of $Fe_2O_3$) was used as the coal ash, and 3 kinds of calcium oxide, common portland cement and gypsum were used as the calcium compounds.

These slurries were used in the same manner as in Examples 17 to 35, thereby preparing solids containing coal ash. In Comparative Example 17, however, vapor curing was carried out without doing an autoclave treatment.

Table 6 shows bulk densities and average particle diameters of the coal ashes used in the respective comparative examples, aluminum contents in the coal ashes, kinds of calcium compounds, blend amounts of the coal ashes and the calcium compounds, and temperatures of the autoclave treatment.

For the thus obtained solids, appearance was observed, and compressive strength and dimensional stability in water were also measured. Table 6 shows the results of these tests. The tests were carried out by the same procedures as in Examples 17 to 35.

TABLE 6 (I)

| Comp. Example | Amount of Coal Ash (wt %) | Bulk Density (g/cm³) | Average Particle Diameter (μm) | Amount of Al₂O₃ (wt %) |
|---|---|---|---|---|
| 10 | 100 | 1.3 | 11 | 24 |
| 11 | 60 | 0.5 | 28 | 27 |
| 12 | 55 | 1.4 | 1 | 29 |
| 13 | 50 | 1.0 | 60 | 29 |
| 14 | 60 | 1.2 | 29 | 40 |
| 15 | 80 | 1.2 | 11 | 24 |
| 16 | 50 | 1.0 | 14 | 28 |
| 17 | 80 | 1.3 | 11 | 26 |
| 18 | 30 | 1.1 | 30 | 27 |

TABLE 6 (II)

| Example | Material Component (wt %) Ca Compound (kind and wt %) | | Autoclave Curing Temp. (°C.) | Characteristics Appearance |
|---|---|---|---|---|
| 10 | — | | 130 | x |
| 11 | 20 (a) | 20 (b) | 160 | o |
| 12 | 25 (a) | 20 (b) | 180 | o |
| 13 | 40 (a) | 10 (b) | 180 | o |
| 14 | 20 (a) | 20 (b) | 160 | o |
| 15 | 20 (e) | | 130 | x |
| 16 | 40 (a) | 10 (b) | 100 | o |
| 17 | 20 (b) | | Vapor Curing | o |
| 18 | 40 (a) | 30 (b) | 160 | o |

Note:
In the item of Ca Compound, (a) means common portland cement, (b) means CaO, and (c) means gypsum.

TABLE 6 (III)

| Comp. Example | Characteristics | | | |
|---|---|---|---|---|
| | Absolute Dry Bulk Density | Compressive Strength (kg/cm³) Compressive Strength | Uneven-ness | Dimensional Stability (%) |
| 10 | — | — | — | — |
| 11 | 0.50 | 29 | 10 | 0.023 |
| 12 | 0.28 | 5 | 1 | 0.028 |
| 13 | 0.35 | 4 | 2 | 0.026 |
| 14 | 0.49 | 28 | 11 | 0.031 |
| 15 | — | — | — | — |
| 16 | 0.36 | 5 | 1 | 0.059 |
| 17 | 0.88 | 30 | 6 | 0.020 |
| 18 | 0.48 | 9 | 2 | 0.060 |

Comparative Examples 19 to 23

Solids containing a coal ash were prepared by the same procedure as in Examples 36 to 49 under conditions that the weight ratio of the coal ash to a calcium compound was set to 70–80% by weight, and 3 kinds of calcium oxide, common portland cement and gypsum were used as the calcium compounds. In Comparative Examples 19 to 22, the thickness of each layer was 30 mm, and in Comparative Example 23, a single layer having a thickness of 90 mm was formed. Furthermore, in Comparative Example 22, vapor curing was carried out for 20 hours without doing an autoclave treatment.

Table 7 shows the kinds of calcium compounds, blend amounts of the coal ash and the calcium compounds, and amounts of a blowing agent to be used in every layer. In addition, temperatures of the autoclave treatment are also shown.

For the thus obtained solids (90×90×150 mm), appearance was observed, and compressive strength and absolute dry bulk densities were also measured. Table 7 shows the results of these tests. The tests were carried out by the same procedures as in Examples 36 to 49.

TABLE 7 (I)

| Example | Material Component (wt %) Ca Compund (kind and wt %) | | Coal Ash | Blowing Agent | Autoclave Curing Temp. (°C.) |
|---|---|---|---|---|---|
| 19 | 0 | | 100 | 0.00 | 180 |
| | 0 | | 100 | 0.20 | 180 |
| | 0 | | 100 | 0.35 | 180 |
| 20 | 50 (e) | | 50 | 0.00 | 150 |
| | 50 (e) | | 50 | 0.10 | 150 |
| | 50 (e) | | 50 | 0.30 | 150 |
| 21 | 20 (a) | | 80 | 0.00 | 100 |
| | 10 (a) | 10 (b) | 80 | 0.07 | 100 |
| | 10 (a) | 10 (b) | 80 | 0.27 | 100 |
| 22 | 30 (a) | | 70 | 0.00 | Vapor Curing |
| | 30 (a) | | 70 | 0.15 | Vapor Curing |
| | 30 (a) | | 70 | 0.40 | Vapor Curing |
| 23 | 15 (a) | 15 (b) | 70 | 0.08 | 180 |

Note 1:
In the item of Ca Compound, (a) means common portland cement, (b) means CaO and (e) means gypsum.
Note 2:
In the item of Material Component, the order of pouring is denoted by upper, middle and lower steps.

TABLE 7 (II)

| Example | Appearanc | Absolute Dry Bulk Density | Compressive Strength (kg/cm²) Compressive Strength | Uneven-ness |
|---|---|---|---|---|
| 19 | x | — | — | — |
| 20 | x | — | — | — |
| 21 | o | 0.9 | 177 | 51 |
| 22 | x | — | — | — |
| 23 | o | 0.9 | 198 | 30 |

As is apparent from the examples and the comparative examples, a coal ash solid prepared by the process of the present invention has excellent dimensional stability and high strength. Furthermore, a lightweight solid and a lightweight multi-layer solid prepared by the process of the present invention additionally have the merit of weight reduction. Incidentally, a lightweight solid and a lightweight multi-layer solid prepared by using a foaming agent or by introducing previously formed air bubbles into a slurry can have the same structure as in the case of using a blowing agent and can also possess similar features.

What is claimed is:

1. A process for preparing a solid material containing coal ash, comprising:

a first step of mixing 10 to 90 parts by weight of coal ash with 90 to 10 parts by weight of a calcium compound selected from the group consisting of calcium oxide, calcium hydroxide, calcium carbonate, calcium silicate, and mixtures thereof, water and an agent selected from the group consisting of a blowing agent and a foaming agent, to obtain at least two mixtures, said at least two mixtures being different from each other in at least one respect selected from the group consisting of the kinds and amounts of coal ash, calcium compound, blowing agent or foaming agent, and water, said coal ash having a bulk density of at least 0.8 g/cm$^3$ and an average particle diameter of 5 to 40 μm, an aluminum content in said coal ash being 35% by weight or less in terms of $Al_2O_3$;

a second step of molding said at least two mixtures to obtain a molded laminated article having a layer of each of said at least two mixtures;

a third step of curing said molded article at 30° to 100° C.; and a fourth step of subjecting the cured article obtained in the third step to a hydrothermal treatment at a temperature of at least 120° C. under pressure.

2. A process for preparing a solid material containing coal ash, comprising:

a first step of mixing 10 to 90 parts by weight of coal ash with 90 to 10 parts by weight of a calcium compound selected from the group consisting of calcium oxide, calcium hydroxide, calcium carbonate, calcium silicate, and mixtures thereof and water to obtain at least two mixtures, said at least two mixtures being different from each other in at least one respect selected from the group consisting of the kinds and amounts of coal ash, calcium compound and water, and of blowing a predetermined amount of air bubbles into each of said at least two mixtures, said coal ash having a bulk density of at least 0.8 g/cm$^3$ and an average particle diameter of 5 to 40 μm, an aluminum content in said coal ash being 35% by weight or less in terms of $Al_2O_3$;

a second step of molding said at least two mixtures to obtain a molded laminated article having a layer of each of said at least two mixtures;

a third step of curing said molded article at 30° to 100° C.; and a fourth step of subjecting the cured article obtained in the third step to a hydrothermal treatment at a temperature of at least 120° C. under pressure.

* * * * *